No. 662,520. Patented Nov. 27, 1900.
W. H. BINNS.
RETAINER FOR BALL BEARINGS.
(Application filed Nov. 4, 1897.)
(No Model.)
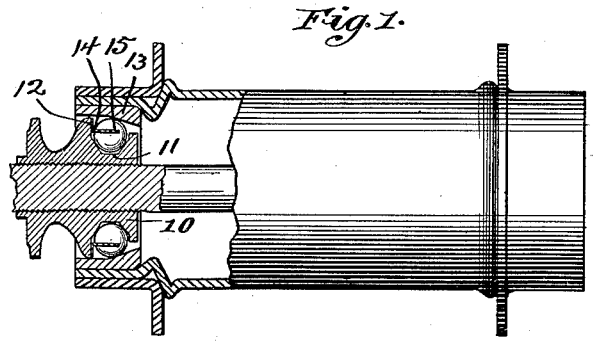
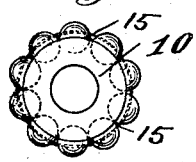
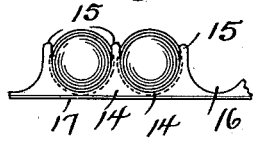
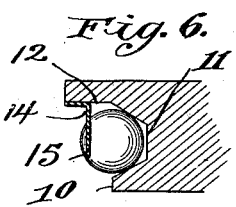
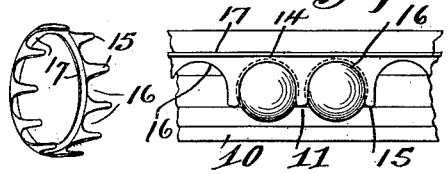
Witnesses,
Inventor,
William H. Binns,
By Offield, Towle & Linthicum
Attys

UNITED STATES PATENT OFFICE.

WILLIAM H. BINNS, OF CHICAGO, ILLINOIS, ASSIGNOR TO THE A. FEATHER-STONE & COMPANY, OF SAME PLACE.

RETAINER FOR BALL-BEARINGS.

SPECIFICATION forming part of Letters Patent No. 662,520, dated November 27, 1900.

Application filed November 4, 1897. Serial No. 657,316. (No model.)

*To all whom it may concern:*

Be it known that I, WILLIAM H. BINNS, a citizen of the United States, residing at Chicago, in the county of Cook and State of Illinois, have invented certain new and useful Improvements in Retainers for Ball-Bearings, of which the following is a specification.

This invention relates to retainers for ball-bearings, and has for its object to provide a device of this character applicable more particularly to bearings wherein a ball-case provided with an external circumferential groove or raceway is employed which shall be simple in construction and application and which shall effectually retain the balls in position in said external groove or raceway, while at the same time their removal or insertion may be readily accomplished.

To these ends my invention consists in the combination, with a ball-case having an external circumferential groove, of a retainer comprising an annular body and a plurality of fingers or projections extending from said body in a direction parallel with the axis of the bearing between the balls thereof, said fingers or projections being flexible and preferably elastic to permit the insertion or removal of the balls.

In the accompanying drawings, Figure 1 is an elevation, partly in central section, of a bicycle-hub having my improvement applied thereto. Fig. 2 is a detached end elevation of the ball-case, balls, and retainer. Fig. 3 is an enlarged plan view of a portion of the retainer and balls, showing their relative proportions. Fig. 4 is a perspective view of one form of the retainer. Fig. 5 is a similar view of a modified form. Fig. 6 is an enlarged detail sectional view of a portion of a bearing with its axis in a vertical position, and Fig. 7 is an elevation of the same.

In the said drawings I have shown my invention as applied to the bearing of a bicycle-hub, and specifically to that type of bearing known as a "three-point" bearing, to which type of bearing my present invention is particularly adapted, although it is applicable to other bearings comprising a ball-casing having an external groove or raceway.

In the construction shown, 10 represents the ball-casing, provided with an external circumferential groove or raceway 11, which in the present instance is shown as having oppositely-inclined sides to provide two points of bearing for the balls. The casing is further provided with an annular flange or shoulder 12 to form a seat or abutment for the retainer. Coöperating with the ball-case is an annular cone 13, having an inclined inner surface to provide the third point of bearing for the balls.

The retainer consists of an annular body 14, from which fingers or projections 15 extend in a direction parallel to the axis of rotation of the bearing, said fingers or projections being so located relatively to each other with relation to the dimensions of the balls employed as to project between each pair of balls in the manner shown in the drawings. These fingers or projections are located at a point radially outward beyond the line of travel of the centers of the balls and extend from the body portion transversely to a point beyond the central plane of the bearing, so that the recesses or spaces 16 between said fingers or projections are of less width than the diameter of the balls, so that while said balls project through said spaces they may not pass bodily through the same. The fingers or projections are flexible, so as to allow of their being bent to permit the insertion and removal of the balls, and are preferably elastic, so as to return to their normal position after this operation has been performed.

In practice I prefer to construct the entire retainer of sheet metal—as, for example, sheet-steel—of the desired elasticity. The body of the retainer may be provided with an annular flange 17, which seats itself or abuts against the seat or shoulder 12 of the ball-case. This flange may be turned outwardly, as shown in Fig. 4 of the drawings, or it may be turned in the opposite direction and extend inwardly toward the axis of the bearing, as shown in Fig. 5. It may, however, be entirely dispensed with, as the abutment of the annular body of the retainer against a suitable seat provided therefor will be sufficient to maintain the device in its proper position. The retainer thus constructed serves in an obvious manner to retain the balls within the external groove or raceway of the ball-case, while at the same time permitting them to travel freely in said raceway when the bearing is in use. The ball-case may be removed and inverted in the position shown in Figs. 6 and 7 of the drawings without any danger of the balls dropping out of place. When the fingers are constructed of elastic material, the balls may be inserted or removed by simply pressing them in or out, the fingers yielding sufficiently to permit their insertion or removal by comparatively gentle pressure. The entire retainer may be struck up from thin sheet metal, and is therefore not only extremely simple in construction, but adapted to be produced at a minimum cost.

By the phrase "parallel with the axis of the bearing," which I have employed in the descriptive portion and claim of this specification as applied to the fingers or projections of the retainer, I do not intend to limit myself to an exact mathematical parallelism of said fingers or projections to said axis, as I wish it understood that the scope of my invention includes a construction in which said fingers or projections extend in the general direction of said axis and transversely to the path or line of travel of the balls even if inclined to the plane of said path.

I claim—

The combination, with a ball-case having an external circumferential groove or raceway adapted to receive a plurality of balls, and an annular seat adjacent to said groove or raceway, of a plurality of balls in said groove or raceway, a retainer comprising an annular body having a radial flange to abut against said seat, and elastic fingers or projections projecting from said body between the balls parallel with the axis of the bearing, substantially as described.

WILLIAM H. BINNS.

Witnesses:
FREDERICK C. GOODWIN,
IRVINE MILLER.